US012649359B2

(12) United States Patent
Bolle et al.

(10) Patent No.: US 12,649,359 B2
(45) Date of Patent: Jun. 9, 2026

(54) ELECTRIC DRIVE SYSTEM WITH POWER TAKE-OFF (PTO) AND ELECTRIC DRIVE OPERATING METHOD

(71) Applicant: Dana Belgium N.V., Bruges (BE)

(72) Inventors: Korneel Bolle, St-Amandsberg (BE); Stijn Goossens, Erpe-Mere (BE); Bert Hannon, Bruges (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/658,809

(22) Filed: May 8, 2024

(65) Prior Publication Data

US 2025/0346108 A1     Nov. 13, 2025

(51) Int. Cl.
B60K 6/365 (2007.10)
B60K 6/387 (2007.10)
B60K 17/08 (2006.01)
B60K 6/48 (2007.10)

(52) U.S. Cl.
CPC .............. B60K 6/365 (2013.01); B60K 6/387 (2013.01); B60K 17/08 (2013.01); *B60K 2006/4816* (2013.01)

(58) Field of Classification Search
CPC ........ B60K 6/365; B60K 6/387; B60K 17/08; B60K 2006/4816; B60K 1/02; B60K 6/547; F16H 2200/2038
See application file for complete search history.

(56) References Cited

U.S. PATENT DOCUMENTS

| | | | | |
|---|---|---|---|---|
| 9,447,848 | B2 * | 9/2016 | Beck | F16H 3/66 |
| 11,549,570 | B2 | 1/2023 | Van Dingenen et al. | |
| 2021/0018072 | A1 | 1/2021 | Steinberger et al. | |
| 2023/0174043 | A1 * | 6/2023 | Goossens | B60W 10/08 701/50 |
| 2023/0243391 | A1 | 8/2023 | Versini et al. | |

* cited by examiner

*Primary Examiner* — Derek D Knight
(74) *Attorney, Agent, or Firm* — McCoy Russell LLP

(57) ABSTRACT

Systems and methods for an electric drive. The electric drive system includes, in one example, a first electric machine rotationally coupled to a first sun gear in a first planetary gear set and a second electric machine rotationally coupled to a second sun gear in a second planetary gear set. The electric drive system further includes a first clutch configured to selectively rotationally couple the second sun gear to a first ring gear in the first planetary gear set, a second clutch configured to ground a second ring gear in the second planetary gear set, and a power take-off (PTO) clutch configured to selectively rotationally couple the first electric machine or the first planetary gear set to a PTO device.

6 Claims, 6 Drawing Sheets

| Operating Mode | Lower-Speed Clutch (156) | Higher-Speed Clutch (154) | PTO Clutch (158) |
|---|---|---|---|
| Ultra-low speed mode | Engaged | Engaged | Engaged |
| Lower-speed mode | Engaged | Disengaged | Engaged |
| Higher-speed mode | Disengaged | Engaged | Engaged |

ELECTRIC DRIVE SYSTEM WITH POWER TAKE-OFF (PTO) AND ELECTRIC DRIVE OPERATING METHOD

TECHNICAL FIELD

The present disclosure relates to an electric drive system with a power take-off (PTO) and a dual electric machine architecture.

BACKGROUND AND SUMMARY

Electric drivelines have been used in a variety of vehicle platforms to fulfill the electrification needs of different vehicle sectors. Electric drivelines achieve increased efficiency and decreased emissions when compared to full internal combustion engine drivelines. Certain vehicle platforms demand power take-offs (PTOs) for providing power to different auxiliary devices when needed. However, in certain electric drivelines difficulties have arisen with regard to providing desired speed and torque to the auxiliary devices across the vehicle's speed range. Electric PTOs, where a standalone electric motor is directly coupled to a PTO device, have been provided in some vehicles in an attempt to fulfill the PTO demands.

However, the inventors have recognized several issues with electric PTOs. For instance, the use of standalone electric PTOs increases the complexity and decreases the space efficiency of the electric driveline which affects driveline packaging, manufacturing, servicing, and repair. The inventors have also recognized a desire to absorb PTO energy during certain operating conditions.

The inventors have recognized the aforementioned issues and developed an electric drive system to at least partially address the issues. The electric drive system includes, in one example, a first electric machine rotationally coupled to a first sun gear in a first planetary gear set and a second electric machine rotationally coupled to a second sun gear in a second planetary gear set. The electric drive system further includes a first clutch configured to selectively rotationally couple the second sun gear to a first ring gear in the first planetary gear set and a second clutch configured to ground a second ring gear in the second planetary gear set. The electric drive system even further includes a PTO clutch that is configured to selectively rotationally couple the first electric machine or the first planetary gear set to a PTO device. In this way, an electric PTO where an PTO device is directly driven by a standalone electric motor may be omitted from the electric drive, if desired, thereby enhancing driveline performance at lower speeds, in particular. Further, the electric drive system is capable of providing PTO capabilities at high tractive effort (e.g., maximum tractive effort). Further, using the two clutches in the abovementioned arrangement allows for power split operation to the PTO in two of three operating modes of the electric drive. Further, the electric drive system is able to compensate for PTO and road load changes and achieves higher ratio flexibility and increased operating range, if desired.

In one example, the electric drive system further includes a controller that is configured to engage the second clutch, disengage the first clutch, engage the PTO clutch and operate the first electric machine in a regeneration mode. In such an example, the PTO clutch may be engaged when an output speed of the gearbox reaches or surpasses a threshold value. In this way, the electric drive system exhibits PTO capabilities even during higher tractive effort (e.g., maximum tractive effort) when the vehicle operates above the threshold speed, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Electric drive systems are described herein that are able to avoid the use of an electric power take-off (PTO), if so desired, thereby enhancing the drive system's capabilities, particularly at lower speeds. Further, the electric drive systems described herein are able to provide PTO power capabilities at higher tractive efforts (e.g., maximum tractive efforts), particularly when the system is operated above a threshold speed. Furthermore, the electric drive systems described herein are able to absorb PTO regeneration energy particularly when both electric machines in the electric drive are connected to the driveline. Further, the electric drives described herein are able to power split to the PTO and the gearbox in two of the three operating modes. Consequently, it is easier to compensate for PTO and road load changes as well as simplifying powershifting between the operating modes, if desired. Further, the electric drive systems described herein are able to achieve higher ratio flexibility and increased operating range via an increase in powertrain efficiency. To achieve the abovementioned characteristics, the electric drive system includes, in one example, two electric machines which provide mechanical power to a gearbox that includes a first planetary gear set and a second planetary gear set. A PTO clutch which is rotationally connected to the first electric machine or a first ring gear in the first planetary gear set is additionally included in the electric drive. Further, a first clutch in the gearbox is configured to selectively ground a second ring gear in the second planetary gear set and a second clutch in gearbox is configured to selectively rotationally connect the first ring gear to a sun gear in the second planetary gear set. This exemplary electric drive architecture as well as the other electric drive variants described herein or combinations of the variants allow the above mentioned characteristics, performance gains, etc. to be achieved.

Figure 1:
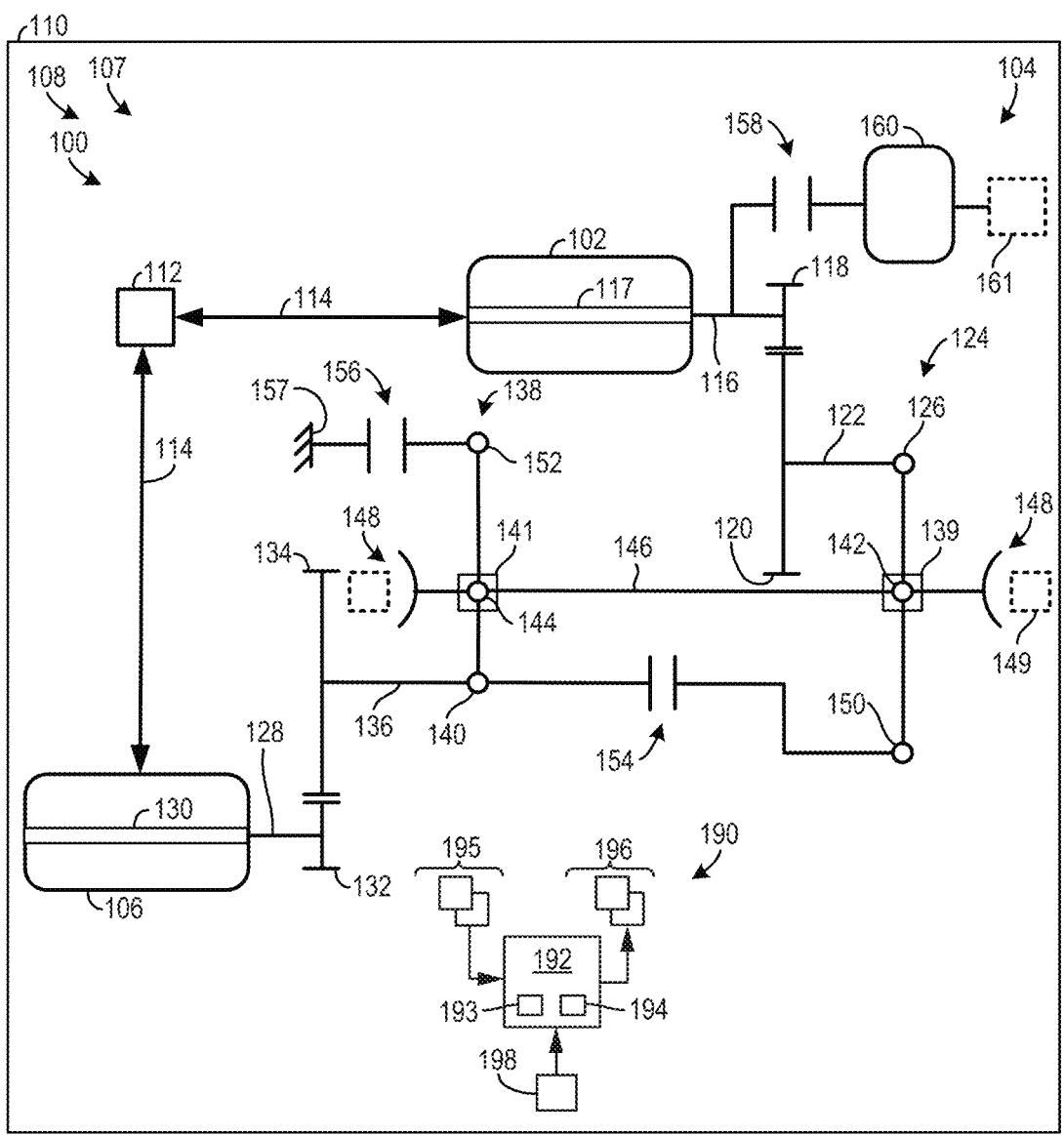
FIG. 1 is a diagram of a first exemplary electric drive with two electric machine, two range clutches, a PTO clutch, and two planetary gear sets.

FIG. 1 shows an example of an electric drive 100 with an electric machine 102, a gearbox 104, and another electric machine 106. The electric machines 102 and 106 may specifically be traction motors. It will be understood that the electric drive 100 may be included in an electric drive system 107. The electric machines 102 and 106 each include a stator and a rotor with a shaft that is coupled to a downstream component. Further, the electric machines are configured to operate in drive modes where mechanical power is generated by the motors and in regeneration modes where the motors generate electrical energy.

The electric drive 100 may be included in an electric powertrain 108 of an electric vehicle (EV) 110, in one example. The EV may be an all-electric vehicle (e.g., a battery electric vehicle) or a hybrid electric vehicle (HEV). Further, the EV may be a light, medium, or heavy duty vehicle.

In the electric drive 100, an energy storage device 112 (e.g., one or more traction batteries, capacitor(s), fuel cell(s), combinations thereof, and the like) is electrically coupled to the electric machines 102 and 106. Arrows 114 indicate the electrical energy flow between the energy storage device 112 and the electric machines 102 and 106. To elaborate, when the machines are designed as multi-phase electric machines, inverters that are electrically coupled to the energy storage device may be used to provide electric power to the electric machines. As such, electrical energy may flow between the inverter and the energy storage device during drive operation and regeneration operation, when the electric machines are designed as motor-generators.

The electric machine 102 is rotationally coupled to a shaft 116. To elaborate, a rotor shaft 117 in the electric machine 102 is rotationally coupled to the shaft 116. A gear 118 is fixedly coupled to the shaft 116 and meshed with a gear 120 that is fixedly coupled to a shaft 122. The shaft 122 is rotationally coupled to a planetary gear set 124. To elaborate, the shaft 122 is rotationally coupled to a sun gear 126 in the planetary gear set 124.

As described herein a simple planetary gear set is a planetary gear set with solely a ring gear, a sun gear, a carrier, and multiple planet gears that are in the same plane as the ring gear and the sun gear and rotate on the carrier.

Similarly, the electric machine 106 is rotationally coupled to a shaft 128. To elaborate, a rotor shaft 130 in the electric machine 106 is rotationally coupled to the shaft 128. A gear 132 is fixedly coupled to the shaft 128 and meshed with a gear 134 that is fixedly coupled to a shaft 136. The shaft 136 is rotationally coupled to a planetary gear set 138. To elaborate, the shaft 136 is rotationally coupled to a sun gear 140 in the planetary gear set 138.

Figures 2, 5:
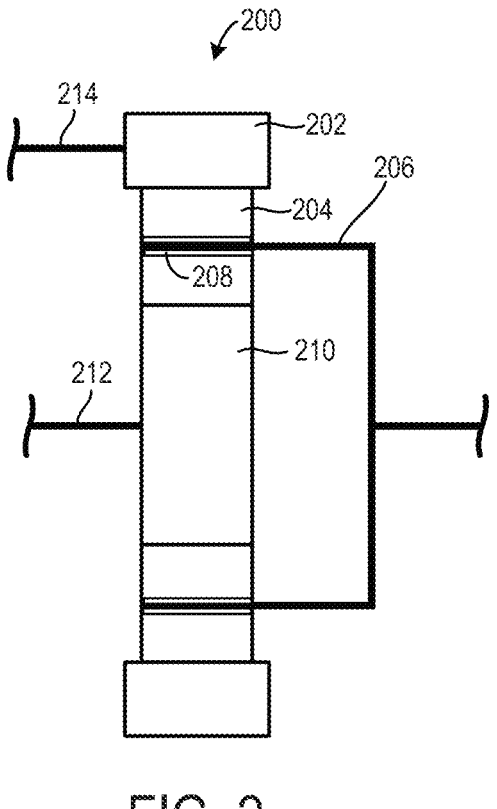
FIG. 2 is an example of a planetary gear set.
FIG. 5 is a table of the clutch configurations in the three operating modes of the electric drive, depicted in FIGS. 4A-4C.

An example of a planetary gear set 200 is shown in FIG. 2. The planetary gear set 200 serves as an example of the planetary gear set 124 and the planetary gear set 138, shown in FIG. 1. As illustrated in FIG. 2, the planetary gear set 200 includes a ring gear 202 that mesh with planet gears 204 which rotate on a carrier 206. As such, bearings 208 (e.g., needle bearings) coupled to the planet gears 204 allow the planet gears to rotate on the carrier 206. Further, in the planetary gear set 200, a sun gear 210 meshes with the planet gears 204. A shaft 212 coupled to the sun gear 210 and a shaft 214 coupled to the ring gear 202 are further shown in FIG. 2. The shafts 212 and 214 as well as the carrier 206 function as inputs or outputs depending on the configuration of the electric drive and whether the planetary gear set is the planetary gear set 124 or the planetary gear set 138, shown in FIG. 1.

Returning to FIG. 1, the components of the planetary gear sets 124 and 138 are represented via nodes. It will be appreciated that sets of planet gears 139 and 141 rotate on carriers 142 and 144, respectively, in the planetary gear set 124 and the planetary gear set 138, respectively, that are depicted in FIG. 1. The planetary gear set 124 includes the sun gear 126 that is rotationally coupled to the gear 120 via the shaft 122. The carriers 142 and 144 are rotationally coupled to one another via a shaft 146. Further, the carriers 142 and 144 are each coupled to an output interface 148. The output interfaces 148 may each be coupled to an axle differential 149 via suitable mechanical components such as shafts, joints, chains, combinations thereof or may be directly coupled to the differentials. The axle differentials are coupled to drive wheels via axle shafts (e.g., half shafts). In such an example, each axle differential is rotationally coupled to axle shafts. In other examples, the output interfaces may be coupled to alternate driveline components. The planetary gear set 124 further includes a ring gear 150 and the planetary gear set 138, likewise, includes a ring gear 152.

A clutch 154 (e.g., a higher speed clutch) is included in the gearbox 104 and configured to selectively rotationally couple the sun gear 140 and the ring gear 150.

Another clutch 156 (e.g., a lower speed clutch) is included in the gearbox 104. The clutch 156 is configured to selectively ground the ring gear 152 to a stationary component 157 such as a housing or other suitable component. Further, a PTO clutch 158 is included in the gearbox 104 which is configured to selectively permit mechanical power transfer between the shaft 116 and a PTO device 160. The PTO device 160 may be a mechanical PTO in one example, or a hydraulic PTO in another example. To elaborate, the PTO device 160 may be a hydraulic pump, a variable displacement pump, a gear pump, a motor-generator, and the like. In turn, the PTO device 160 may be configured to attach to different types of auxiliary devices 161.

The clutches described herein are configured to be engaged where mechanical power is transfer through the components which the clutch is coupled to. Conversely, when the clutches are disengaged, mechanical power flow between the components associated with the clutches is inhibited. Further, the clutches described herein may be friction clutches (e.g., wet friction clutches) that include interleaved plates which allow for torque modulation through the clutch. As such, the gearbox 104 may be configured to powershift between operating modes where the torque hand-off between the clutches smoothly unfolds with a decreased amount of torque spikes and/or interruption, thereby decreasing noise, vibration, and harshness (NVH) associated with shifting transients. However, in other examples, one or more of the clutches described herein may be synchronizers, dog clutches, combinations thereof, and the like.

The electric drive 100 may further include a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data that represents instructions that are executable by a processor for performing the methods and control techniques described herein as well as other variants that are anticipated but not specifically listed. As such, control techniques, methods, and the like expanded upon herein may be stored as instructions in non-transitory memory.

The controller 192 may receive various signals from sensors 195 coupled to various regions of the electric drive 100. For example, the sensors 195 may include electric machine speed sensors, electric machine temperature sensors, wheel speed sensors, gearbox speed sensors, input device configuration sensor, and the like. Electric machine speed may be ascertained from the amount of power sent from the inverter to the electric machine 102. An input device 198 (e.g., accelerator pedal, brake pedal, drive mode selector, gear selector, combinations thereof, and the like, in the EV example) may further provide input signals indicative of an operator's intent for electric drive control. For instance, the drive mode selector may allow an operator to select the first operational mode, the second operational mode, and the third operational mode of the electric drive, discussed in greater detail herein.

Upon receiving the signals from the various sensors 195 of FIG. 1, the controller 192 processes the received signals, and employs various actuators 196 of the electric drive components to adjust the components based on the received signals and instructions stored on the memory of controller 192. For example, the controller 192 may receive a signal indicative of an operator's request for increased electric machine output. In response, the controller 192 may command operation of an inverter to adjust the power output of one of the electric machines, thereby increasing the amount of mechanical power delivered from the selected electric machine to the gearbox 104. The other controllable components in the electric drive may function in a similar manner in relation to sensor inputs and command outputs.

Figure 4A:
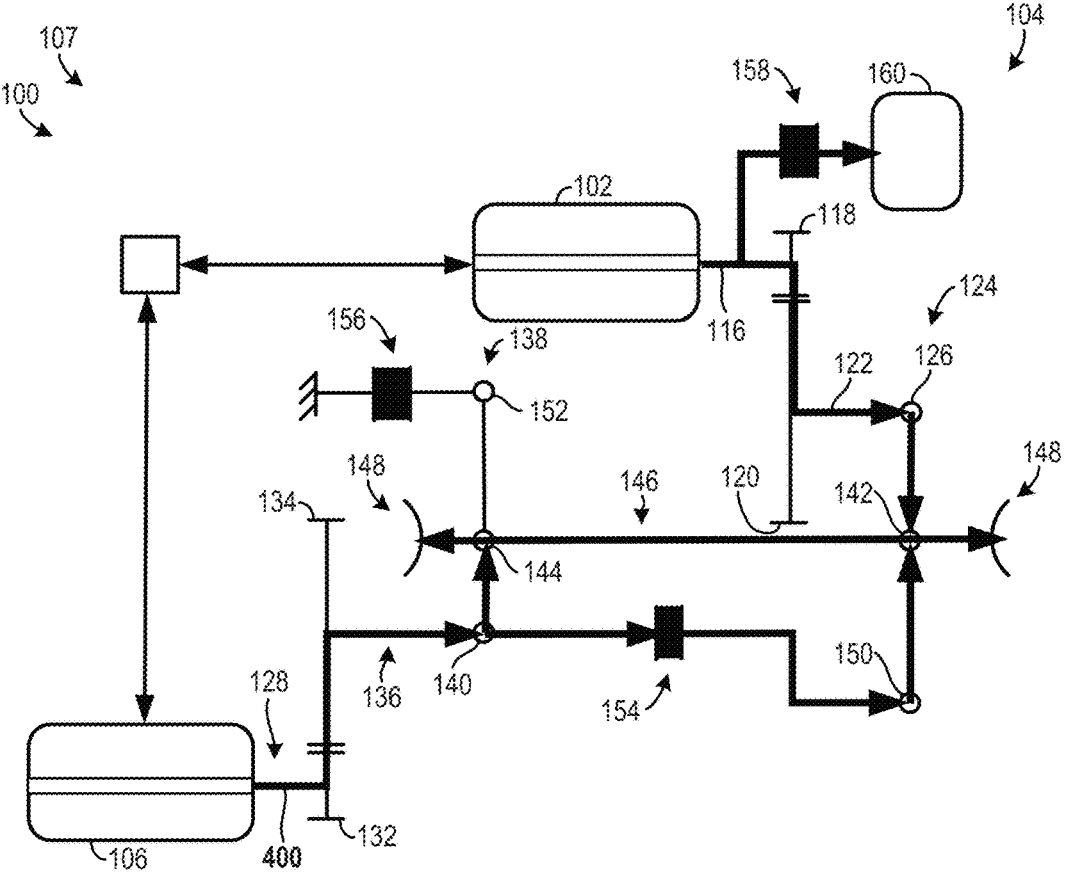
FIGS. 4A-4C are mechanical power paths through the electric drive, depicted in FIG. 1, in three operating modes.
Figures 4B, 4C:
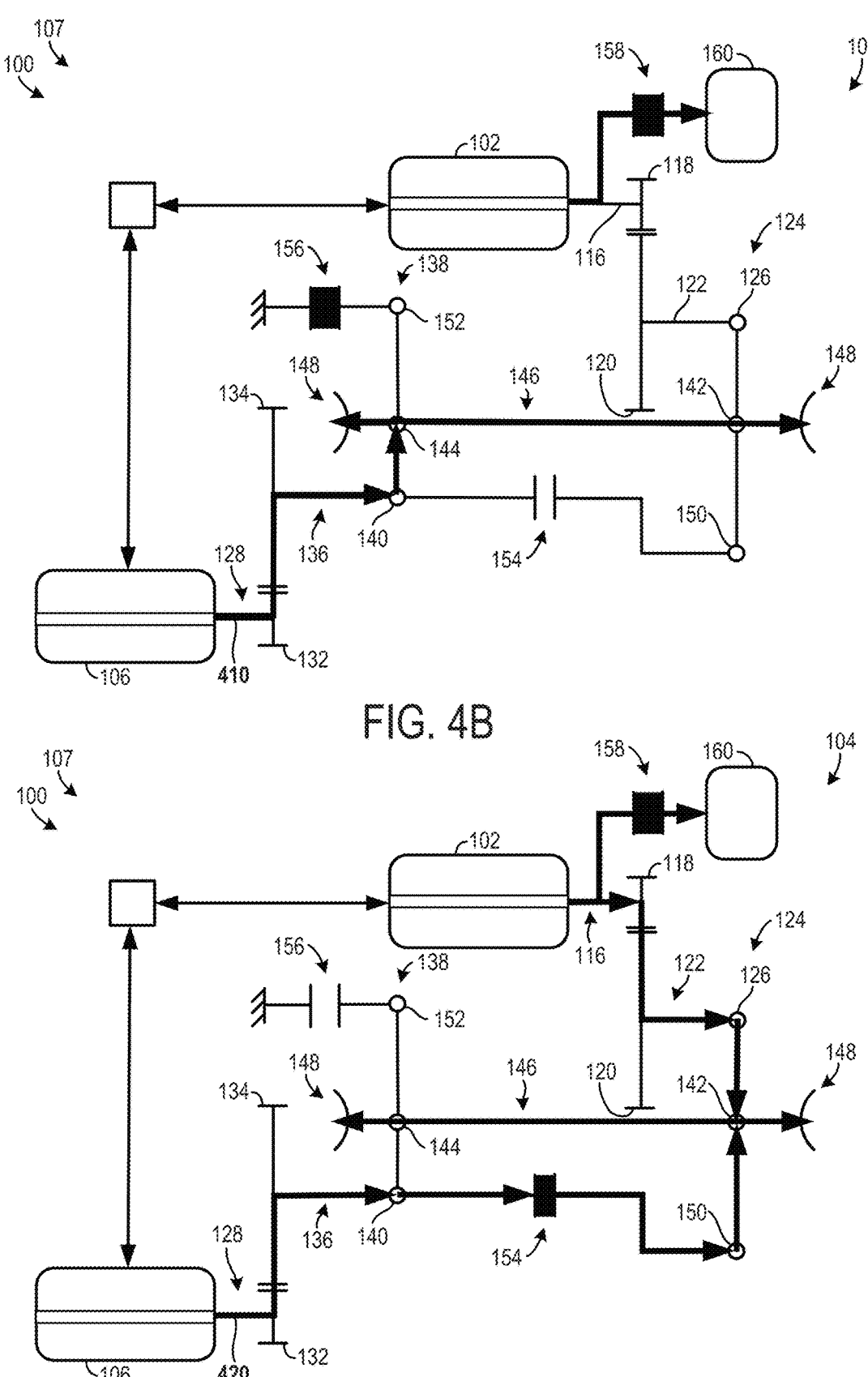

The electric drive 100 is configured to operate in a first mode (e.g., a lower-speed mode), a second mode (e.g., a mid-speed mode), and a third mode (e.g., a higher speed mode). The first mode may be referred to as an ultra-low speed mode, the second mode may be referred to as a lower-speed mode, and the third mode may be referred to as a higher-speed mode, in one specific example. The controller 192 may be configured to transition between the modes by engaging and/or disengaging selected clutches in the gearbox 104. These modes for the electric drive are discussed in greater detail herein. The PTO clutch 158 may be engaged in any of these modes to expand the electric drive's capabilities, thereby increasing customer appeal. Power paths through the electric drive 100 in the different operating modes as shown in FIGS. 4A-4C and discussed in greater detail herein. As such, the electric drive components are similarly numbered in FIGS. 1 and 4A-4C.

Figure 3:
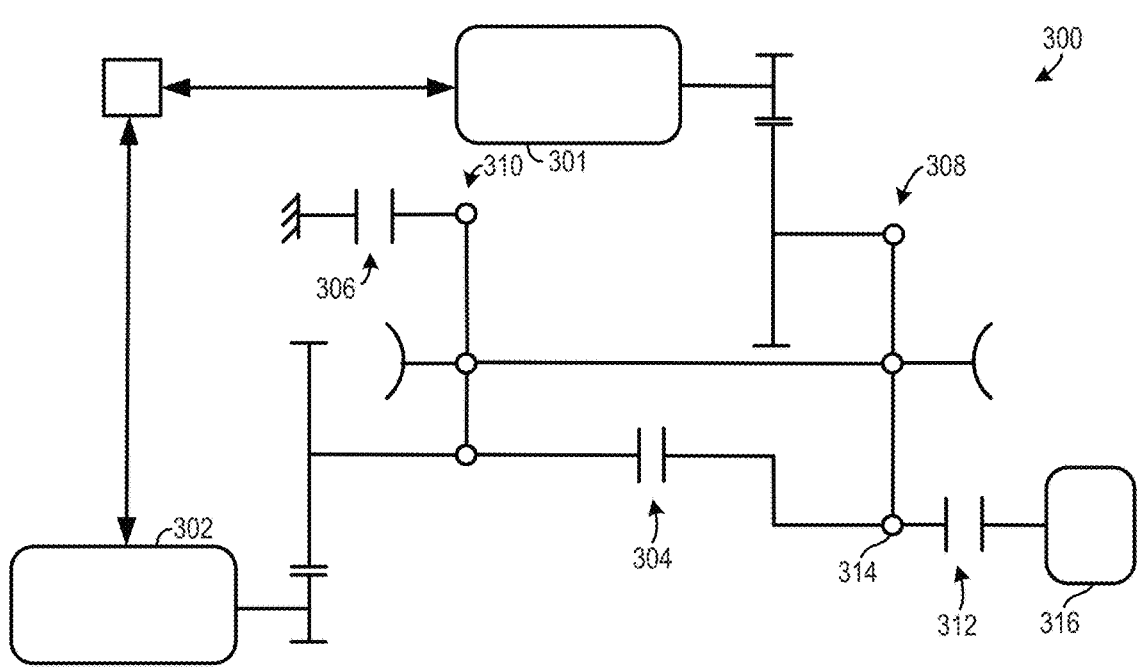
FIG. 3 is a diagram of a second exemplary two electric machine, two range clutches, a PTO clutch, and two planetary gear sets.

FIG. 3 shows another example of an electric drive 300 which includes electric machines 301 and 302, clutches 304 and 306, and planetary gear sets 308 and 310 which have a similar architecture to the corresponding components depicted in FIG. 1. Therefore, redundant description is omitted for brevity. However, the electric drive 300 depicted in FIG. 3 includes a PTO clutch 312 that is rotationally coupled to a ring gear 314 in the planetary gear 308. The PTO clutch 312 is again rotationally coupled to a PTO device 316.

FIGS. 4A-4C show power paths through the electric drive 100 in the first mode, the second mode, and the third mode, respectively. Specifically, the first mode may be referred to as an ultra-low speed mode, the second mode may be referred to as a lower-speed mode, and the third mode may be referred to as a higher-speed mode, as previously indicated. In other examples, the first mode may be referred to as a lower-speed mode, second mode may be referred to as a mid-speed mode, and the third mode may be referred to as a higher speed mode. The power paths specifically correspond to drive mode operation (e.g., forward drive mode operation or reverse drive mode operation) in the system.

The output torque ($T_{out}$) and the output speed ($w_{out}$) of the gearbox in the first mode (e.g., the ultra-low speed mode) may be calculated using equations 1 and 2, respectively, given below. Further, a list of the parameters and variables used in the equations herein are also provided below.

$$r_1 = \text{gear}(132)$$

$$r_2 = \text{gear}(134)$$

$$r_3 = \text{gear}(118)$$

$$r_4 = \text{gear}(120)$$

$$r_{s_{in}} = \text{sun gear}(140)$$

$$r_{r_{in}} = \text{ring gear}(152)$$

$$r_{r_{out}} = \text{ring gear}(150)$$

$$r_{s_{out}} = \text{sun gear}(126)$$

$$T_{EM1} = \text{electric machine}(102)\text{ torque}$$

$$T_{EM2} = \text{electric machine}(106)\text{ torque}$$

$$T_{PTO} = PTO\text{ device}(160)\text{ torque}$$

$$T_{out} = \text{gearbox}(104)\text{ output torque}$$

$$W_{out} = \text{gearbox}(104)\text{ output speed}$$

$$T_{out} = (T_{EM1} - T_{PTO})\left(-\frac{r_4}{r_3}\right)\left(\frac{r_{r_{out}} + r_{s_{out}}}{r_{s_{out}}}\right) + \quad \{\text{Equation 1}\}$$

$$\left(T_{EM2}\left(-\frac{r_2}{r_1}\right) + \left((T_{EM1} - T_{PTO})\left(-\frac{r_4}{r_3}\right)\left(\frac{r_{r_{out}}}{r_{s_{out}}}\right)\right)\right)\left(\frac{r_{r_{in}} + r_{s_{in}}}{r_{s_{in}}}\right)$$

$$W_{out} = W_{EM2}\left(\frac{-r_1}{r_2}\right)\left(\frac{r_{s_{in}}}{r_{s_{in}} + r_{r_{in}}}\right) \quad \{\text{Equation 2}\}$$

The output torque ($T_{out}$) and the output speed ($w_{out}$) of the gearbox in the second mode (e.g., the lower-speed mode) may be calculated using equations 3 and 4, respectively, given below. Further, the torque generated by the first electric machine 102 may be equal to the torque applied to the PTO device 160 in the second mode.

$$T_{out} = T_{EM2}\left(-\frac{r_2}{r_1}\right)\left(\frac{r_{s_{in}} + r_{r_{in}}}{r_{s_{in}}}\right) \quad \{\text{Equation 3}\}$$

$$W_{out} = W_{EM2}\left(\frac{-r_1}{r_2}\right)\left(\frac{r_{s_{in}}}{r_{s_{in}} + r_{r_{in}}}\right) \quad \{\text{Equation 4}\}$$

The output torque ($T_{out}$) and the output speed ($w_{out}$) of the gearbox and the torque generated by the electric machine 102 in the third mode (e.g., the higher-speed mode) may be calculated using equations 5, 6, and 7, respectively, given below. It will be appreciated that other variants of the electric drive where different equations are used to determine output torque and output speed have been contemplated.

$$T_{out} = T_{EM2}\left(-\frac{r_2}{r_1}\right)\left(\frac{r_{r_{out}} + r_{s_{out}}}{r_{r_{out}}}\right) \quad \{\text{Equation 5}\}$$

-continued $$W_{out} = W_{EM2}\left(-\frac{r_1}{r_2}\right)\left(\frac{r_{s_{out}}}{r_{s_{out}} + r_{r_{out}}}\right) + W_{EM1}\left(-\frac{r_3}{r_4}\right)\left(\frac{r_{r_{out}}}{r_{s_{out}} + r_{r_{out}}}\right) \quad \{\text{Equation 6}\}$$

$$T_{EM1} = T_{PTO} + \left(\frac{r_3}{r_4}\right)\left(T_{EM2}\left(\frac{r_2}{r_1}\right)\left(\frac{r_{s_{out}}}{r_{r_{out}}}\right)\right) \quad \{\text{Equation 7}\}$$

Turning specifically to FIG. 4A, while the electric drive 100 is operating in the first mode, the ring gear 152 is grounded via the clutch 156 and the clutch 154 is engaged to rotationally couple the sun gear 140 and the ring gear 150. Further, in the illustrated example, the PTO clutch 158 is engaged. However, as previously indicated, the PTO clutch 158 may also be disengaged and the PTO is operable in any of the modes described herein, thereby expanding the drive unit's capabilities. The mechanical power path in the first mode (denoted via arrows 400) unfolds as follows: mechanical power moves from the electric machines 102, 106 to the gears 118, 132, respectively, from the gears 118, 132 to the gears 120, 134, respectively, from the gear 120 to the sun gear 126, from the gear 134 to the sun gear 140, from the sun gears 126, 140 to the carriers 142, 144 respectively, and from the carrier 142, 144 to the output interfaces 148. Further, mechanical power flows from the sun gear 140 to the ring gear 150 and from the ring gear 150 to the carrier 140. Further, mechanical power flows from the shaft 116 to the PTO clutch 158 and then the PTO device 160.

Turning specifically to FIG. 4B, while the electric drive 100 is operating in the second mode, the ring gear 152 is grounded via the clutch 156 and the clutch 154 is disengaged. Further, in the illustrated example, the PTO clutch 158 is engaged. However, as previously indicated, the PTO clutch 158 may also be disengaged and the PTO is operable in any of the modes described herein, thereby expanding the drive unit's capabilities. The mechanical power path in the second mode (denoted via arrows 410) unfolds as follows: mechanical power moves from the electric machines 102, 106 to the gears 118, 132, respectively, from the gears 118, 132 to the gears 120, 134, respectively, from the gear 134 to the sun gear 140, from the sun gear 140 to the carrier 144, and from the carrier 144 to the output interfaces 148. Further, mechanical power flows from the shaft 116 to the PTO clutch 158 and then the PTO device 160.

Turning specifically to FIG. 4C, while the electric drive 100 is operating in the third mode, the clutch 156 is disengaged and the clutch 154 is engaged to rotationally couple the sun gear 140 and the ring gear 150. Further, in the illustrated example, the PTO clutch 158 is engaged. However, as previously indicated, the PTO clutch 158 may also be disengaged and the PTO is operable in any of the modes described herein, thereby expanding the drive unit's capabilities. The mechanical power path in the third mode (denoted via arrows 420) unfolds as follows: mechanical power moves from the electric machines 102, 106 to the gears 118, 132, respectively, from the gears 118, 132 to the gears 120, 134, respectively, from the gear 120 to the sun gear 126, from the gear 134 to the sun gear 140, from the sun gear 126 to the carrier 142, from the carrier 142 to the output interfaces 148. Further, in the mechanical power path, power moves from the sun gear 140 to the ring gear 150 by way of the clutch 154. Further, mechanical power flows from the shaft 116 to the PTO clutch 158 and then the PTO device 160.

In the illustrated example, the PTO system is operated to deliver mechanical power to the PTO device 160. However, it will be appreciated that in other examples, in the second mode and the third mode, mechanical power may flow from the PTO device 160 to the electric machine 102 via the PTO clutch 158 in a regeneration mode where the electric machine 102 is generating electrical energy. In this way, electric drive efficiency is increased.

FIG. 5 shows a table 500 corresponding to the clutch configurations in the ultra-low speed mode whose power path is depicted in FIG. 4A, the lower-speed mode whose power path is depicted in FIG. 4B, and the higher-speed power path whose power path is depicted in FIG. 4C. As shown in FIG. 5, the ultra-low speed clutch, the higher-speed clutch, and the PTO clutch are engaged in the lower-speed mode. In the lower-speed mode, the lower-speed clutch is engaged, the higher-speed clutch is disengaged, and the PTO clutch is engaged. Further, in the higher-speed mode, the lower-speed clutch is disengaged, the higher-speed clutch is engaged, and the PTO clutch is engaged. It will be understood, that the PTO clutch may be disengaged in any of the operating modes based on PTO demands. Additionally, it will be appreciated that the PTO clutch may be engaged to deliver power to the PTO device or receive power from the PTO device in a regeneration mode.

Figure 6:
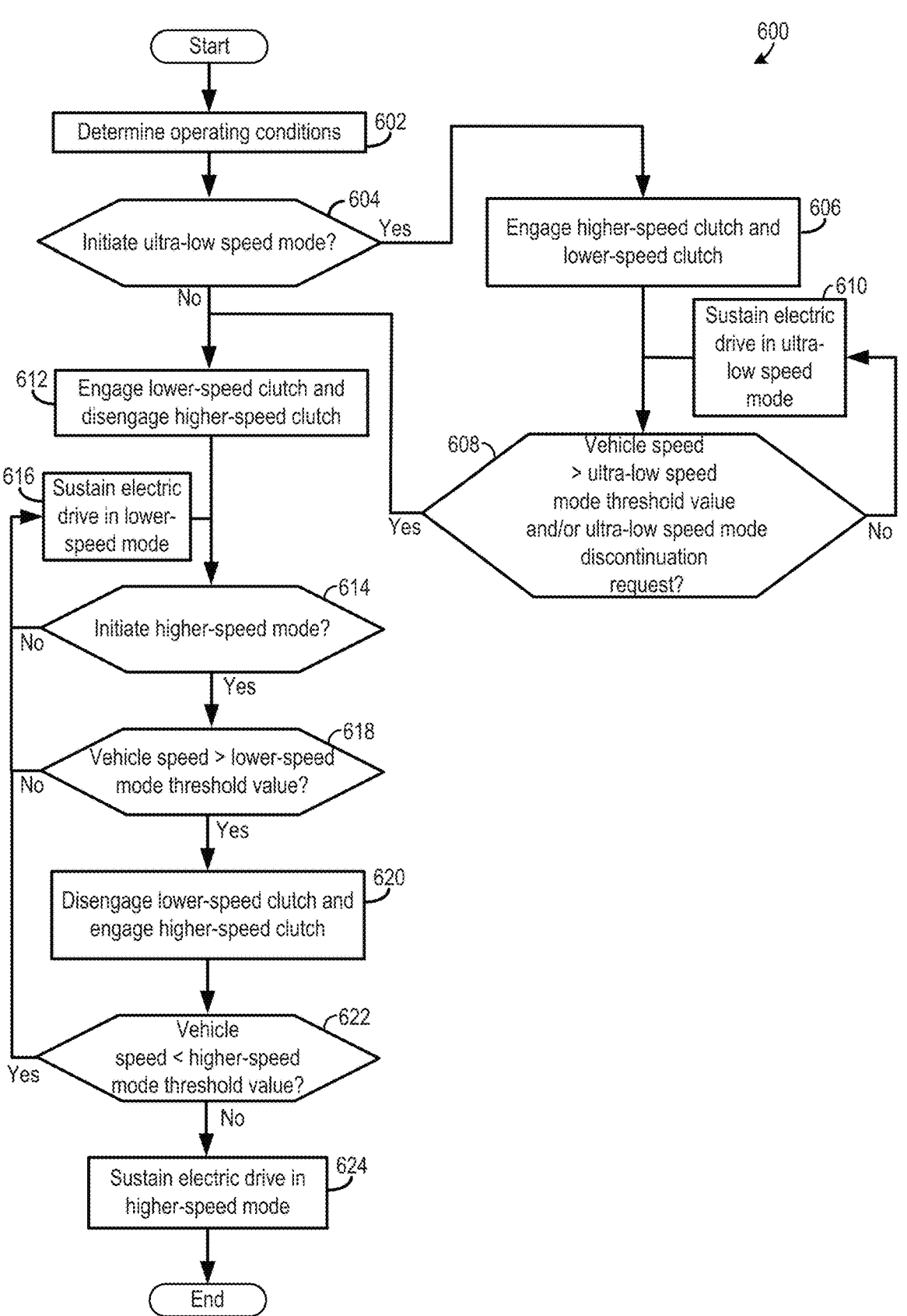
FIG. 6 is a flow chart of a method for shifting between different modes in an electric drive that includes two electric machine, two range clutches, a PTO clutch, and two planetary gear sets.

FIG. 6 shows a method 600 for operation of an externally excited electric machine system. The method 600 may be carried out by the electric drive 100 shown in FIG. 1 or the electric drive 300 shown in FIG. 3. In other examples, the methods may be implemented via other suitable electric drive systems or combinations of the systems described herein. Furthermore, the method 600 may be implemented by a controller that includes memory holding instructions for the method steps that are executable by a processor, as previously indicated.

At 602, the method includes determining operating conditions in the electric drive, vehicle, and the components included therein. The operating conditions may be ascertained from sensors and/or modeling and may include clutch configurations, electric machine speeds, gearbox output speed, clutch configurations, gearbox load, drive wheel speed, PTO load, PTO operation request, and the like.

At 604, the method includes judging if an ultra-low speed mode should be implemented. This judgement may take into account an operator mode request, vehicle speed, vehicle load, combinations thereof, and the like. For instance, an operator may interact with a mode selector to generate an ultra-low speed mode operation request, and in response to the controller receiving the request, the method may make an affirmative judgement regarding decision block 604. Additionally or alternatively, when the vehicle speed enters a range that corresponds to the ultra-low speed mode the method may make an affirmative judgement regarding decision block 604.

If it is determined that the electric drive should be operated in the ultra-low speed mode (YES at 604) the method moves to 606. At 606, the method includes engaging the higher-speed clutch and the lower-speed clutch. Next at 608, the method includes determining if the vehicle speed is greater than an ultra-low speed mode threshold value or an ultra-low speed mode discontinuation request has been received. An ultra-low speed mode discontinuation request may include a request generated in response to operator interaction with a mode selector that indicates a desire to shift the gearbox from the ultra-low speed mode to the lower-speed mode.

If it is determined that the vehicle speed is not greater than the ultra-low speed mode threshold value and an ultra-low speed mode discontinuation request has not been received (NO at 608) the method moves to 610 where the method includes sustaining the electric drive in the ultra-low speed mode. To elaborate, engagement of the higher speed clutch and the lower speed clutch are maintained at step 610.

Conversely, if it is determined that the vehicle speed is greater than the ultra-low speed mode threshold value and/or an ultra-low speed mode discontinuation request has been received (YES at 608) the method moves to 612. Further, if it is determined at step 604 that the ultra-low speed mode should not be initiated (NO at 604) the method advances to 612. At 612, the method includes engaging the lower-speed clutch and disengaging the higher-speed clutch. In this way, the lower-speed mode is initiated. Next at 614, the method includes judging if the higher speed mode should be initiated. This judgement may be carried out based on a higher speed mode request generated in response to operator input received via a mode selector. To expound, the operator may request a transition from the lower-speed mode to the higher-speed mode and step 614 may be judged as affirmative.

If it is determined that the higher speed mode should not be initiated (NO at 614) the method moves to 616. At 616, the method includes sustaining the electric drive in the lower-speed mode. Conversely, if it is determined that the higher speed mode should be initiated (YES at 614) the method moves to 618. At 618, the method includes judging if the vehicle speed is greater than a lower-speed mode threshold value. If it is determined that the vehicle speed is not greater than the lower-speed mode threshold (NO at 618), the method moves to 616.

If it is determined that the vehicle speed is greater than the lower-speed mode threshold value (YES at 618), the method moves to 620. At 620, the method includes disengaging the lower speed clutch, and engaging the higher speed clutch to transition into the higher speed mode.

Next at 622, the method includes judging if the vehicle speed is less than a higher-speed mode threshold value. If it is determined that the vehicle speed is less than the higher-speed mode threshold value (YES at 622), the method moves to 616. Conversely, if it is determined that the vehicle speed is not less than the higher-speed mode threshold (NO at 622) the method moves to 624. At 624, the method includes sustaining the electric drive in the higher speed mode. To expound, engagement of the higher-speed clutch is sustained and disengagement of the lower-speed clutch is sustained. Method 600 allows the gearbox to efficiently transition between the different operating modes to increase electric drive performance.

Figure 7:
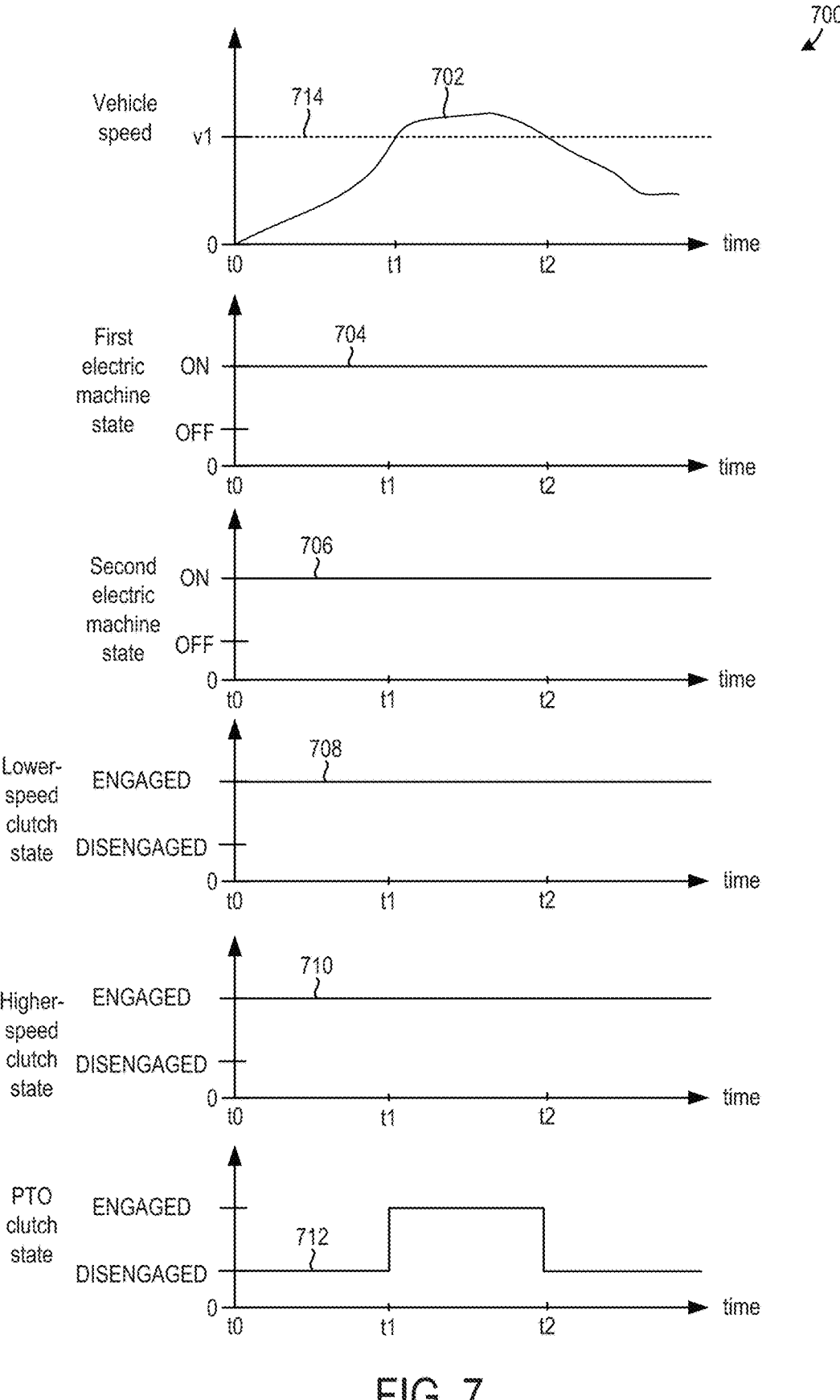
FIG. 7 is a timing diagram corresponding to an exemplary electric drive operating strategy.

FIG. 7 shows a prophetic timing diagram 700 of an electric drive system operating technique. This operating technique may be implemented in any of the electric drive systems described herein or combinations of the systems. In each graph, time is indicated on the abscissa and increases from left to right, although specific numerical values are not indicated.

The ordinate for plot 702 indicates vehicle speed, the ordinate for plot 704 indicates the operation state (i.e., "ON" or "OFF") of the first electric machine (e.g., electric machine 102), shown in FIG. 1), plot 706 indicates the operation state of the second electric machine (e.g., electric machine 106, shown in FIG. 1), plot 708 indicates the operational state (i.e., "ENGAGED or DISENGAGED") of the lower-speed clutch (e.g., the clutch 156 shown in FIG. 1), plot 710 indicates the operational state (i.e., "ENGAGED or DISENGAGED") of the higher-speed clutch (e.g., the clutch 154 shown in FIG. 1), and plot 712 indicates the operational state (i.e., "ENGAGED or DISENGAGED") of the PTO clutch (e.g., the clutch 158 shown in FIG. 1).

In the timing diagram 700, from time t0 to t2, the first electric machine and the second electric machine remain on to deliver power to the gearbox and the lower-speed clutch as well as the higher-speed clutch remain engaged. As such, the electric drive system is operating in first mode (e.g., referred to as an ultra-low speed mode in some of the examples discussed above).

At t1, the vehicle speed surpasses a threshold value 714 that corresponds to a minimum speed demanded for PTO operation. In response to the vehicle speed surpassing the threshold value, the PTO clutch is engaged. At t2, the vehicle speed falls below the threshold value 714. In response to the vehicle speed dropping below the threshold value 714, the PTO clutch is disengaged. In this way, the window of PTO operation is expanded, thereby increasing customer appeal.

FIGS. 1-4C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. The invention will be further described in the following paragraphs. In one aspect, an electric drive system is provided that comprises a first electric machine rotationally coupled to a first sun gear in a first planetary gear set; a second electric machine rotationally coupled to a second planetary gear set; a first clutch configured to selectively rotationally couple a second sun gear in the second planetary gear set to a first ring gear in the first planetary gear set; a second clutch configured to selectively ground a second ring gear in the second planetary gear set; and a power take-off (PTO) clutch configured to selectively rotationally couple the first electric machine or the first planetary gear set to a PTO device. In one example, the second electric machine may be rotationally coupled to the second sun gear in the second planetary gear set; and the first planetary gear set and the second planetary gear set may be simple planetary gear sets. In another example, the PTO clutch may be coupled to a shaft that is rotationally coupled to a rotor shaft of the first electric machine. In yet another example, the PTO clutch may be coupled to the first ring gear. In another example, a first carrier in the first planetary gear set may be rotationally coupled to a first output interface and a second carrier in the second planetary gear set may be coupled to a second output interface. In yet another example, the first output interface and the second output interface may each be rotationally coupled to axle shafts via an axle differential. In one example, the electric drive system may further comprise a controller including instructions that when executed cause the electric drive system to: powershift between two modes in a set of modes that include a first mode, a second mode, and a third mode. In another example, the controller may include instructions that when while the electric drive system is executed, subsequent to the powershift, cause the electric drive system to: engage the PTO clutch. In yet another example, the system may further comprise a controller including instructions that when executed cause the electric drive system to: engage the second clutch; disengage the first clutch; engage the PTO clutch; and operate the first electric machine in a regeneration mode.

In another aspect, a method for operation of an electric drive system is provided that comprises operating a first clutch and a second clutch to transition the electric drive system between two modes in a set of modes that includes a first mode, a second mode, and a third mode; wherein the electric drive system includes: a first electric machine rotationally coupled to a first planetary gear set; a second electric machine rotationally coupled to a second planetary gear set; the first clutch configured to selectively rotationally couple a second sun gear in the second planetary gear set to a first ring gear in the first planetary gear set; the second clutch configured to selectively ground a second ring gear in the second planetary gear set; and a power take-off (PTO) clutch configured to selectively rotationally couple the first electric machine or the first planetary gear set to a PTO device. The method may further comprise, in one example, operating the electric drive system in the second mode via engaging or sustaining engagement of the second clutch and disengaging or sustaining disengagement of the first clutch. In another example, the method may further include engaging the PTO clutch and operating the first electric machine in a regeneration mode. In another example, the method may further include operating the electric drive system in the first mode via engaging or sustaining engagement of the second clutch and engaging or sustaining engagement the first clutch. In another example, the method may further include engaging the PTO clutch and operating the first electric machine in a regeneration mode, wherein the PTO clutch is engaged in response to vehicle speed surpassing a threshold value.

In another aspect, an electric drive system is provided that comprises a first electric machine rotationally coupled to a first sun gear in a first planetary gear set; a second electric machine rotationally coupled to a second sun gear in a second planetary gear set; a first clutch configured to selectively rotationally couple the second sun gear to a first ring gear in the first planetary gear set; a second clutch configured to selectively ground a second ring gear in the second planetary gear set; and a power take-off (PTO) clutch configured to selectively rotationally couple the first electric machine; wherein a first carrier in the first planetary gear set is rotationally coupled to a first output interface and a second carrier in the second planetary gear set is coupled to a second output interface. In another example, the electric drive system may further include a controller including instructions that when executed cause the electric drive system to: operate the electric drive system in a lower-speed mode via engaging the first clutch and the second clutch. In another example, the controller may include instructions that when executed cause the electric drive system to: engage the PTO clutch in response to vehicle speed surpassing a threshold value. In another example, the electric drive system may comprise a controller including instructions that when executed cause the electric drive system to: operate the electric drive system in a mid-speed mode via engaging the second clutch and disengaging the first clutch. In another example, the controller may include instructions that when executed cause the electric drive system to: engage the PTO clutch; and operate the first electric machine in a regeneration mode. In another example, the method may further include a controller including instructions that when executed cause the electric drive system to: operate the electric drive system in a higher-speed mode via engaging the second clutch and disengaging the first clutch.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to a variety of systems that include electric drives with different types of propulsion sources including internal combustion engines, in a hybrid vehicle example. The subject matter of the present disclosure includes all novel and non-obvious combinations and sub-combinations of the various systems and configurations, and other features, functions, and/or properties disclosed herein.

Note that the example control and estimation routines included herein can be used with various electric drive and/or system configurations. The control methods and routines disclosed herein may be stored as executable instructions in non-transitory memory and may be carried out by the control system including the controller in combination with the various sensors, actuators, and other electric drive and/or system hardware in combination with the electronic controller. As such, the described actions, operations, and/or functions may graphically represent code to be programmed into non-transitory memory of the computer readable storage medium in the electric drive and/or the system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive system, comprising:
a first electric machine rotationally coupled to a first sun gear in a first planetary gear set;
a second electric machine rotationally coupled to a second sun gear in a second planetary gear set;
a first clutch configured to selectively rotationally couple the second sun gear to a first ring gear in the first planetary gear set;
a second clutch configured to selectively ground a second ring gear in the second planetary gear set; and
a power take-off (PTO) clutch configured to selectively rotationally couple the first electric machine;
wherein a first carrier in the first planetary gear set is rotationally coupled to a first output interface that is coupled to a first axle differential; and
wherein a second carrier in the second planetary gear set is coupled to a second output interface that is coupled to a second axle differential.

2. The electric drive system of claim 1, further comprising a controller including instructions that when executed cause the electric drive system to:
operate the electric drive system in a lower-speed mode via engaging the first clutch and the second clutch.

3. The electric drive system of claim 2, wherein the controller includes instructions that when executed cause the electric drive system to:
engage the PTO clutch in response to vehicle speed surpassing a threshold value.

4. An electric drive system, comprising:
a first electric machine rotationally coupled to a first sun gear in a first planetary gear set;
a second electric machine rotationally coupled to a second sun gear in a second planetary gear set;

a first clutch configured to selectively rotationally couple the second sun gear to a first ring gear in the first planetary gear set;
a second clutch configured to selectively ground a second ring gear in the second planetary gear set;
a power take-off (PTO) clutch configured to selectively rotationally couple the first electric machine;
wherein a first carrier in the first planetary gear set is rotationally coupled to a first output interface and a second carrier in the second planetary gear set is coupled to a second output interface; and
a controller including instructions that when executed cause the electric drive system to:
operate the electric drive system in a mid-speed mode via engaging the second clutch and disengaging the first clutch.

5. The electric drive system of claim 4, wherein the controller includes instructions that when executed cause the electric drive system to:
engage the PTO clutch; and
operate the first electric machine in a regeneration mode.

6. An electric drive system, comprising:
a first electric machine rotationally coupled to a first sun gear in a first planetary gear set;
a second electric machine rotationally coupled to a second sun gear in a second planetary gear set;
a first clutch configured to selectively rotationally couple the second sun gear to a first ring gear in the first planetary gear set;
a second clutch configured to selectively ground a second ring gear in the second planetary gear set;
a power take-off (PTO) clutch configured to selectively rotationally couple the first electric machine;
wherein a first carrier in the first planetary gear set is rotationally coupled to a first output interface and a second carrier in the second planetary gear set is coupled to a second output interface; and
a controller including instructions that when executed cause the electric drive system to:
operate the electric drive system in a higher-speed mode via engaging the second clutch and disengaging the first clutch.

* * * * *